United States Patent
Ranta

(10) Patent No.: US 8,493,227 B2
(45) Date of Patent: Jul. 23, 2013

(54) SYSTEM AND METHOD FOR OPTIMIZING THE POSITION OF A MOBILE DEVICE

(75) Inventor: Craig Eric Ranta, Kitchener (CA)

(73) Assignee: Research In Motion Limited, Waterloo (CA)

( * ) Notice: Subject to any disclaimer, the term of this patent is extended or adjusted under 35 U.S.C. 154(b) by 353 days.

(21) Appl. No.: 12/892,161

(22) Filed: Sep. 28, 2010

(65) Prior Publication Data

US 2012/0075111 A1    Mar. 29, 2012

(51) Int. Cl.
*G08B 21/00* (2006.01)
*G08B 3/00* (2006.01)

(52) U.S. Cl.
USPC ........ 340/689; 340/524; 340/525; 340/691.1; 340/691.6; 340/686.1; 340/815.4

(58) Field of Classification Search
USPC ................................. 340/689, 539.11, 539.13
See application file for complete search history.

(56) References Cited

U.S. PATENT DOCUMENTS

| | | | |
|---|---|---|---|
| 7,755,517 B2 * | 7/2010 | Sarin et al. | 340/988 |
| 2002/0021278 A1 | 2/2002 | Hinckley | |
| 2005/0288858 A1 * | 12/2005 | Amer et al. | 701/211 |
| 2009/0262074 A1 | 10/2009 | Nasiri | |
| 2010/0130251 A1 | 5/2010 | Chu | |

FOREIGN PATENT DOCUMENTS
EP    1732341 A1    12/2006

OTHER PUBLICATIONS

Head to Head: AT&T Pure and Tilt 2: WMExperts; retrieved from http://www.wmexperts.com/att-pure-tilt-2-head-to-head; Apr. 13, 2010.
IBM; Cell Phone Motion-Actions; http://www.ip.com/pubview/IPCOM000155828D; Jul. 20, 2007.
Auto Speaker v1.4 Application for Android; retrieved from http://www.androlib.com/android.application.com-app-autospeaker-Fip.aspx; Apr. 13, 2010.
Another "iPhone killer" fails; Manilla Bulletin; retrieved from http://www.mb.com.ph/print/228663; Apr. 16, 2010.
Extended European Search Report dated May 17, 2011. In corresponding application No. 10180717.0.
The International Search Report and the Written Opinion Report mailed Oct. 18, 2011, in corresponding PCT patent application No. PCT/CA2011/050605.

* cited by examiner

*Primary Examiner* — Donnie Crosland
(74) *Attorney, Agent, or Firm* — Novak Druce Connolly Bove + Quigg LLP

(57) ABSTRACT

A system and method for providing a visual indicator for optimizing the position of a mobile device when the mobile device is being used in a hands free mode. One or more position components in the mobile device can determine the position of the mobile device. The position of the mobile device can be compared to ideal or predetermined positions for improved performance quality. A visual indicator can be provided to provide an indication on whether the mobile device is in an optimal position. The visual indicator can take several forms including an illustration showing how the mobile device should be moved, an animation showing how the mobile device should be moved, colors providing an indication whether the position is acceptable, or any combination thereof.

24 Claims, 6 Drawing Sheets

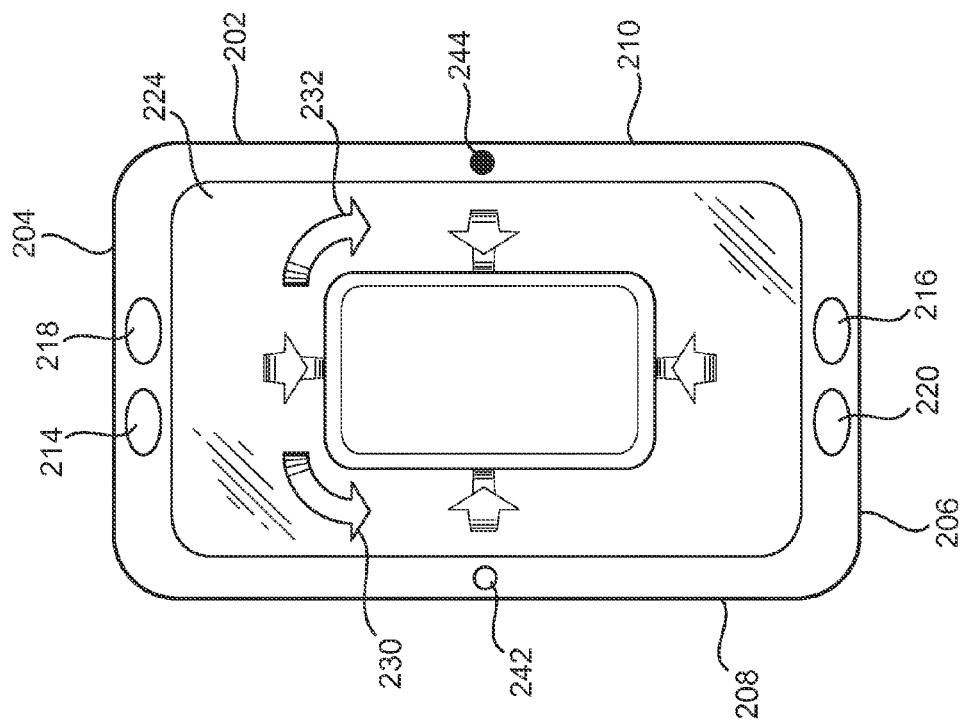
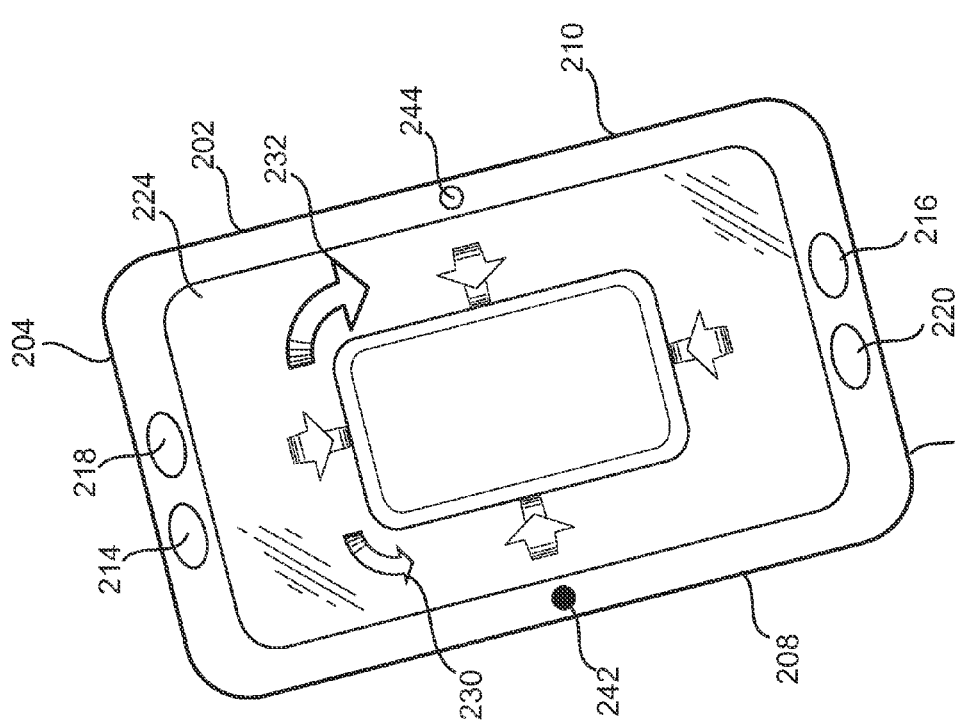

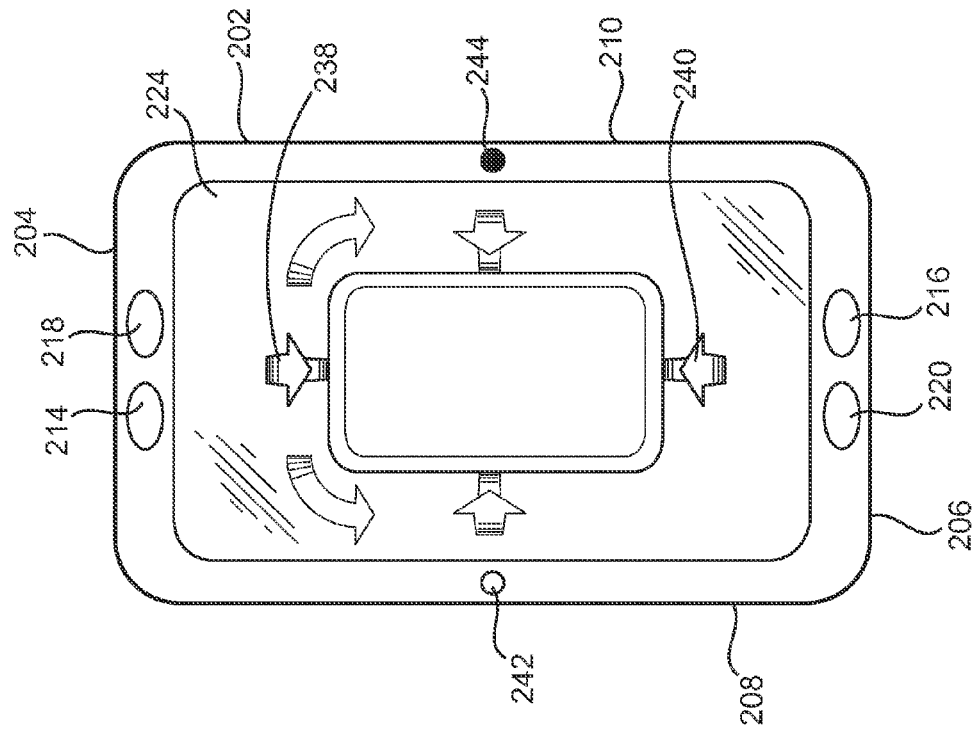
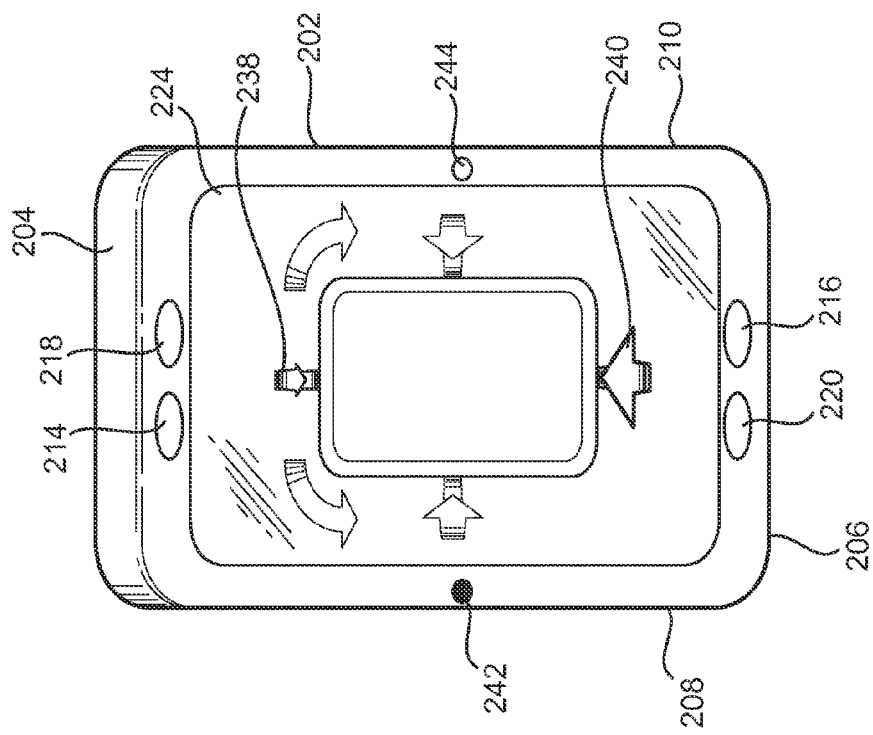

SYSTEM AND METHOD FOR OPTIMIZING THE POSITION OF A MOBILE DEVICE

FIELD

The present disclosure relates to mobile devices, and more specifically to optimizing the position of the mobile device by providing visual feedback.

BACKGROUND

Mobile devices are becoming more prevalent and more advanced. Mobile devices can include, but are not limited to, cellular telephones, smart telephones, wireless personal digital assistants (PDAs), and laptop computers with wireless 802.11 or Bluetooth capabilities. These devices can run on a wide variety of networks from data-only networks such as Mobitex® and DataTAC® networks to complex voice and data networks such as GSM/GPRS, CDMA, EDGE, UMTS and CDMA2000 networks. As the technology associated with mobile devices continues to advance, users of these mobile devices are becoming more reliant on these mobile devices. For example, as technology advances are being made with respect to speakers, conducting conversations using a mobile device in speaker mode or hands free mode is a feasible option due to the improved quality of the audio. Typically, conventional mobile devices are using multiple microphones for noise cancellation and speakerphone algorithms.

BRIEF DESCRIPTION OF THE DRAWINGS

Implementations of the present disclosure will now be described, by way of example only, with reference to the attached Figures, wherein:

FIG. 2 is a front view of a mobile device displaying a visual indicator indicating a yaw change in accordance with an exemplary implementation;

FIG. 3 is a front view of a mobile device displaying a visual indicator after a yaw change in accordance with an exemplary implementation;

FIG. 6 is a front perspective view of a mobile device displaying a visual indicator indicating a pitch change in accordance with an exemplary implementation;

FIG. 7 is a front view of a mobile device displaying a visual indicator after a pitch change in accordance with an exemplary implementation;

DETAILED DESCRIPTION

Figure 1:
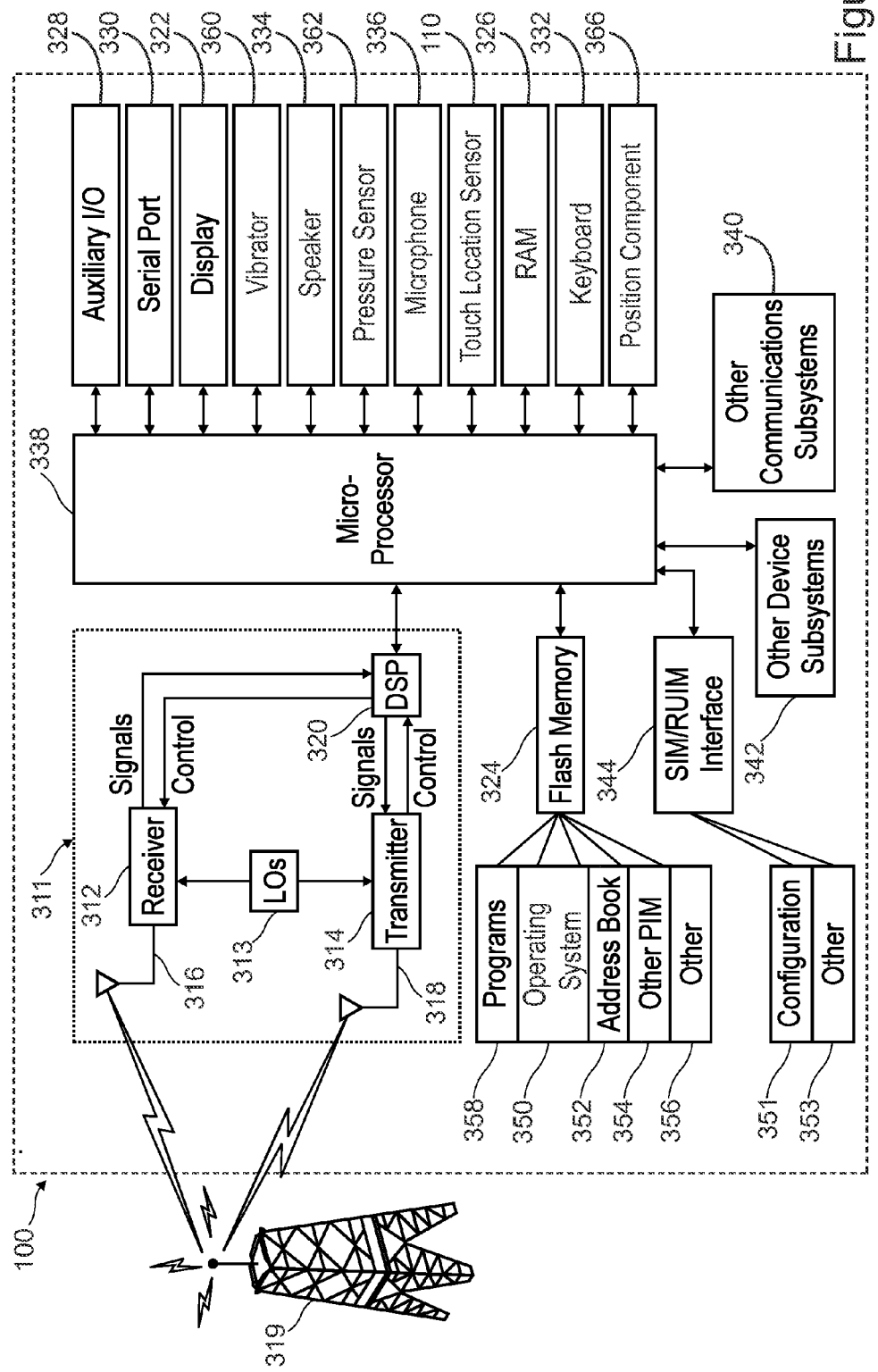
FIG. 1 is a block diagram of a mobile device in a communication network in accordance with an exemplary implementation.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. The term "media" is defined as visual, audio, or combined visual and audio data which can be outputted by a mobile device.

The present disclosure provides a system and method for providing a visual indicator for optimizing the position of a mobile device when the mobile device is being used in a speaker mode. One or more position components in the mobile device can determine the position of the mobile device. The position of the mobile device can be compared to optimal positions for improved audio quality. A visual indicator can be provided to indicate that the mobile device should be adjusted. The visual indicator can show how the mobile device should be adjusted to obtain optimal or improved audio quality.

Referring to FIG. 1, a block diagram of a mobile device in a communication network in accordance with an exemplary implementation is illustrated. As shown, the mobile device 100 can include a microprocessor 338 that controls the operation of the mobile device 100, such as facilitating communications, providing a graphical user interface, executing programs, and so forth. A communication subsystem 311 performs communication transmission and reception with the wireless network 319. The microprocessor 338 further can be coupled with an auxiliary input/output (I/O) subsystem 328 that can be coupled to the mobile device 100. Additionally, in at least one implementation, the microprocessor 338 can be coupled to a serial port (for example, a Universal Serial Bus port) 330 that facilitates communication with other devices or systems via the serial port 330. A display 322 can be communicatively coupled to the microprocessor 338 to facilitate display of information to an operator of the mobile device 100. When the mobile device 100 is equipped with a keyboard 332, which may be physical or virtual (for example, displayed), the keyboard 332 can be communicatively coupled to the microprocessor 338. The mobile device 100 can include one or more speakers 334 and one or more microphones 336, which may advantageously be communicatively coupled to the microprocessor 338 and discussed in further detail below. Additionally, a vibrator 360, such as a vibrator motor, can be communicatively coupled to the microprocessor 338 to generate vibrations in the mobile device 100. Other similar components can be provided on or within the mobile device 100 and are optionally communicatively coupled to the microprocessor 338. Other communication subsystems 340 and other communication device subsystems 342 are generally indicated as communicatively coupled with the microprocessor 338. An example of a communication subsystem 340 is a short-range communication system such as a BLUETOOTH® communication module or a WI-FI® communication module (a communication module in compliance with IEEE 802.11b) and associated circuits and components. Additionally, the microprocessor 338 can perform operating system functions and executes programs or software applications on the mobile device 100. In some implementations, not all of the above components are included in the mobile device 100. The auxiliary I/O subsystem 328 can take the form of one or more different navigation tools (multi-directional or single-directional), external display devices such as keyboards, and other subsystems capable of providing input or receiving output from the mobile device 100.

The mobile device 100 can be equipped with components to enable operation of various programs, as shown in FIG. 1. As shown, the memory 324 can provide storage for the operating system 350, device programs 358, data, and so forth. The operating system 350 can be generally configured to manage other programs 358 that are also stored in memory 324 and executable on the processor 338. The operating system 350 can handle requests for services made by programs 358 through predefined program 358 interfaces. More specifically, the operating system 350 can typically determine the order in which multiple programs 358 are executed on the processor 338 and the execution time allotted for each program 358, manages the sharing of memory 324 among multiple programs 358, handles input and output to and from other device subsystems 342, and so forth. In addition, operators can interact directly with the operating system 350 through a user interface, typically including the keyboard 332 and display screen 322. The operating system 350, programs 358, data, and other information can be stored in memory 324, RAM 326, read-only memory (ROM), or another suitable storage element (not shown). An address book 352, personal information manager (PIM) 354, and other information 356 can also be stored.

The mobile device 100 can be enabled for two-way communication within voice, data, or voice and data communication systems. A Subscriber Identity Module (SIM) or Removable User Identity Module (RUIM) can be utilized to authorize communication with the communication network 319. A SIM/RUIM interface 344 within the mobile device 100 can interface a SIM/RUIM card to the microprocessor 338 and facilitates removal or insertion of a SIM/RUIM card (not shown). The SIM/RUIM card features memory and can hold key configurations 351, and other information 353 such as identification and subscriber related information. The mobile device 100 can be equipped with an antenna 318 for transmitting signals to the communication network 319 and another antenna 316 for receiving communication from the communication network 319. Alternatively, a single antenna (not shown) can be utilized to transmit and receive signals. A communication subsystem 311 can include a transmitter 314 and receiver 312, one or more antennae 316, 318, local oscillators (LOs) 313, and a processing module 320 such as a digital signal processor (DSP) 320.

The mobile device 100 can include a touch-sensitive display or touchscreen 224 that includes one or more touch location sensors 364, an overlay 226, and a display 322, such as a liquid crystal display (LCD) or light emitting diode (LED) display, such as shown in FIG. 2. The touch location sensor(s) 364 can be a capacitive, resistive, infrared, surface acoustic wave (SAW), or other type of touch-sensitive sensor and can be integrated into the overlay 226. The overlay 226, or cover, can be comprised of laminated glass, plastic, or other suitable material(s) and is advantageously translucent or transparent. A touch, or touch contact, can be detected by the touchscreen 224 and processed by the processor 338, for example, to determine a location of the touch. Touch location data can include the center of the area of contact or the entire area of contact for further processing. A touch may be detected from a contact member, such as a body part of a user, for example a finger or thumb, or other objects, for example a stylus, pen, or other pointer, depending on the nature of the touch location sensor.

The mobile device 100 can include a position component 366 which can detect the position of the mobile device 100. For example, the position component 130 can detect the position or one or more angles of the mobile device 100. The angles can include the roll, pitch, and yaw angles. The position component can be an accelerometer, a gyroscope, a mercury switch, or any other device than can determine the position of the mobile device 100.

By knowing the position of the mobile device 100, position data from the position component 366 can be compared to one or more predetermined position data, for example, ideal or optimal positions of the mobile device 100. For example, the processor 338 can compare the position data such as the yaw, roll, and pitch angles with one or more predetermined position data such as acceptable ranges for each angle. Based on the comparison, the processor 338 can provide a visual indicator to a user informing a user whether the position of the mobile device is in an acceptable position based at least in part on the comparison.

Referring to FIGS. 2-9, various front views of a mobile device in accordance with exemplary implementations are illustrated. As shown, the mobile device 100 can include a first speaker 214, a second speaker 216, a first microphone 218, and a second microphone 220. The first speaker 214 and the second speaker 216 can be on opposite sides of each other and on the short portions of the mobile device 100. For example, the first speaker 214 can be on the first short portion 204 and the second speaker 216 can be on the second short portion 206. The first microphone 218 and the second microphone 220 can be on opposite sides of each other and on the short portions of the mobile device 100. For example, the first microphone 218 can be on the first short portion 204 and the second microphone 220 can be on the second short portion 206. In a speaker or hands free mode, one or both speakers 214, 216 and one or both microphones 218, 220 can be activated. For example, a first transducer can be on the first short portion 204 and a second transducer can be on the second short portion 206.

As shown in FIGS. 2-9, each audio component 214, 216, 218, 220 is shown on a top surface 222 of the mobile device 100. Although the audio component 214, 216, 218, 220 are shown on the top surface 222, one or more audio components 214, 216, 218, 220 can be on or about one or more of the top surfaces 222, side, bottom surface or any combination thereof. In one or more implementations, the mobile device can include more or less audio components. In one or more implementations, the audio components can be transducers which can be configured to provide a speaker function or a microphone function.

The mobile device 100 can include one or more position components 366 to detect the position of the mobile device 100. For example, a position component 366 can detect the current position of the mobile device 100 which can include yaw, pitch and roll angles. A single position component 366 can determine all three angles or one or more positions components 366 can detect each angle of the mobile device 100. For example, each angle can have a dedicated position component 366. The position component 366 can include one or more accelerometers, gyroscopes, mercury switches, any combination thereof, or any other device or devices that can detect the position of the mobile device 100.

By knowing the position of the mobile device 100, the determined position can be compared with one or more predetermined or optimal positions. The optimal positions can be positions of a mobile device 100 which provide optimal or acceptable performance or quality. The predetermined positions can be stored in the memory 324 of the mobile device. For example, the predetermined positions can be loaded during or after the mobile device 100 is manufactured. The predetermined positions can be determined via testing, for example, bench testing, of the mobile device 100 to determine one or more positions in which the quality of audio of the mobile device 100 is determined to be optimal or above acceptable criteria. After comparing the detected position of the mobile device 100, the processor 338 can provide a visual indication whether the detected position of the mobile device 100 is acceptable. The visual indication can take several forms, including but not limited to providing an illustration showing how the mobile device 100 should be adjusted, an animation showing how the mobile device 100 should be adjusted, one or more light emitting diodes indicating whether the detected position is acceptable or not, or any other visual indicator providing an indication whether the detected position is acceptable or how to move the mobile device 100 into an acceptable position. In one or more implementations, an audio indicator can be used to provide an indication whether the detected position is acceptable or not.

Figure 4:
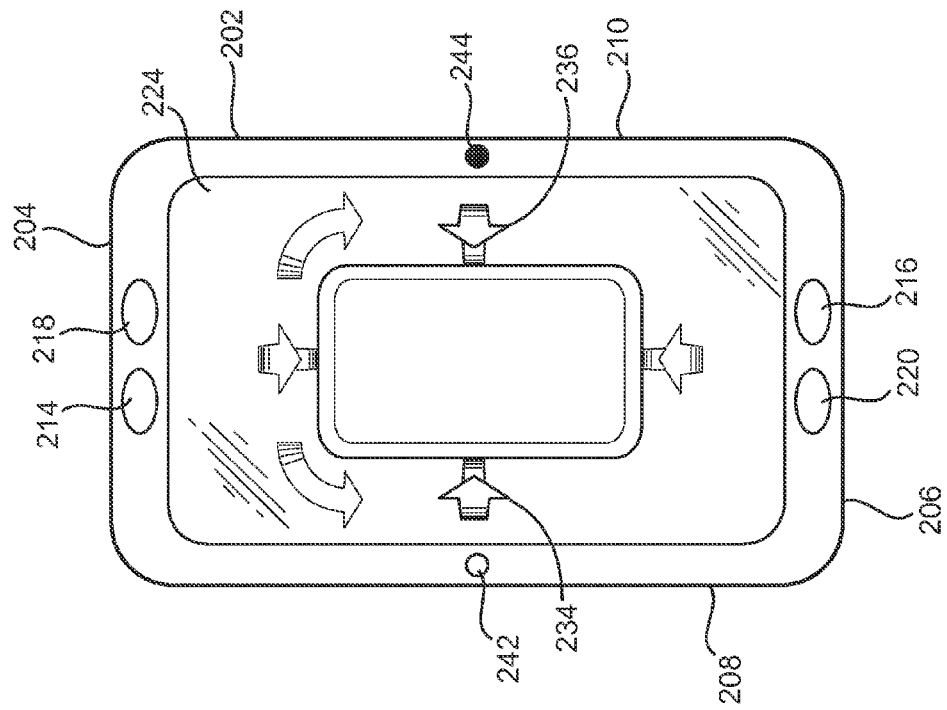
FIG. 4 is a front perspective view of a mobile device displaying a visual indicator indicating a roll change in accordance with an exemplary implementation.
Figure 8:
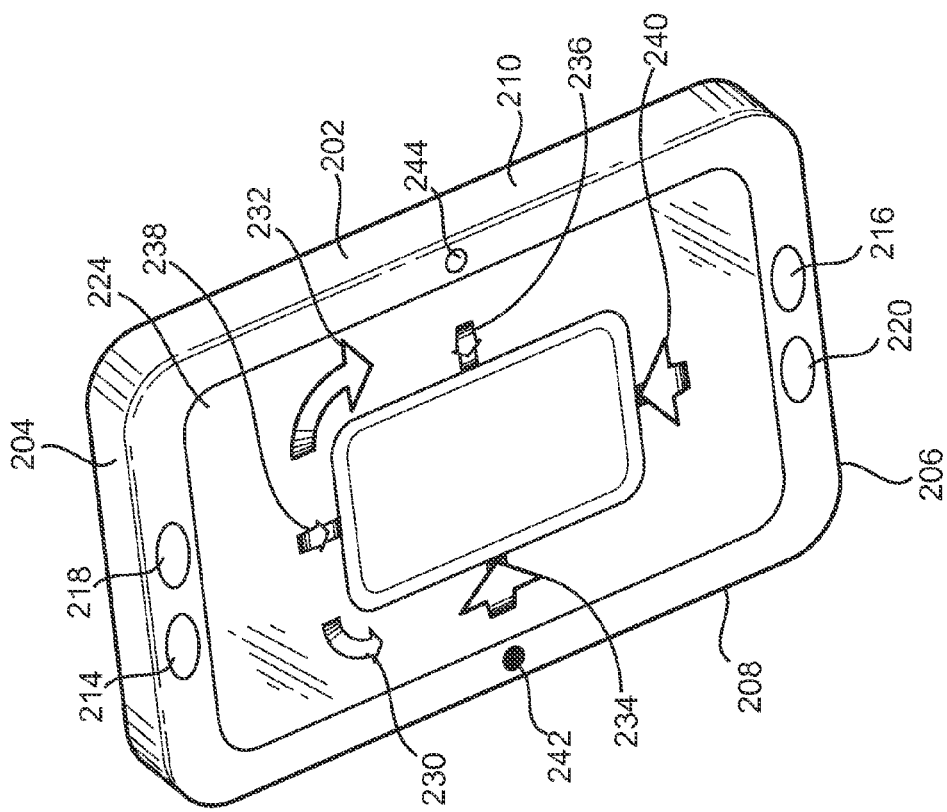
FIG. 8 is a front perspective of a mobile device displaying a visual indicator indicating a yaw, roll and pitch change in accordance with an exemplary implementation.

Referring to FIGS. 2-9, various front views of a mobile device displaying a visual indicator in accordance with an exemplary implementation are illustrated. As shown, the processor 338 can display an image of a mobile device with three sets of arrows: a first yaw arrow 230, a second yaw angle 232, a first roll arrow 234, a second roll arrow 236, a first pitch arrow 238, and a second pitch arrow 240. To provide an indication of how to move the mobile device 100, the arrows can be shown in different sizes, color, or both. For example, as shown in FIG. 2, the second yaw arrow 232 is shown as being larger than the first yaw arrow 230 to indicate the yaw angle of the mobile device 100 needs to be adjusted, for example, lowered. In another example, as shown in FIG. 4, the first roll arrow 234 is shown as being larger than the second roll arrow 236 to indicate the roll angle of the mobile device 100 needs to be adjusted, for example, twisted. In another example, as shown in FIG. 6, the second pitch arrow 240 is shown as being larger than the first pitch arrow 242 to indicate the pitch angle of the mobile device 100 needs to be adjusted, for example, tilted backwards. In yet another example, as shown in FIG. 8, the second yaw arrow 232, the first roll arrow 234, and the second pitch arrow 240 are shown as being larger than the first yaw arrow 230, the second roll arrow 236, and the first pitch arrow 238, respectively, to indicate that the yaw, roll and pitch angles of the mobile device 100 need to be adjusted. After the device is adjusted as suggested in FIGS. 2, 4, 6, and 8 another image of a mobile device 100 can be displayed as shown in FIGS. 3, 5, 7, and 9 indicating that the mobile device 100 is in an acceptable position.

In one or more implementations, the arrows 230, 232, 234, 236, 238, 240 can be shown in different manners, for example, lengths or sizes, to provide an indication of the relative amount the mobile device 100 should be moved into an acceptable position. In one or more implementations, the arrows 230, 232, 234, 236, 238, 240 can be shown in different colors to indicate how the mobile device 100 should be moved. For example, a red arrow can indicate that the angle (yaw, roll, pitch or any combination thereof) should be moved and a green arrow can indicate that the angle is in an acceptable position. In one or more implementations, an animation can be displayed to show how the mobile device 100 should be adjusted. For example, the display can switch back and forth between the images shown in FIGS. 2 and 3, FIGS. 4 and 5, FIGS. 6 and 7, or FIGS. 8 and 9.

Referring to FIGS. 2-9 again, the mobile device 100 can include one or more light emitting diodes (LED) 242, 244 to provide an indication whether the mobile device 100 is in an acceptable position. For example, a first colored LED 242, for example, a red LED, can indicate that the mobile device 100 is not in an acceptable position and a second colored LED 244, for example, a green LED, can indicate that the mobile device 100 is in an acceptable position. In one or more implementations, a multicolored LED (not shown) can be used. For example, the multicolored LED can be illuminated in a first color, for example, green, to indicate that the mobile device 100 is not in an acceptable position and a second color, for example, red, to indicate that the mobile device 100 is not in an acceptable position. As shown in FIGS. 2, 4, 6, and 8, the first colored LED 242 is illuminated indicating that the mobile device 100 is not in an acceptable position. As shown in FIGS. 3, 5, 7, and 9, the second colored LED 244 is illuminated indicating that the mobile device 100 is in an acceptable position.

Figure 10:
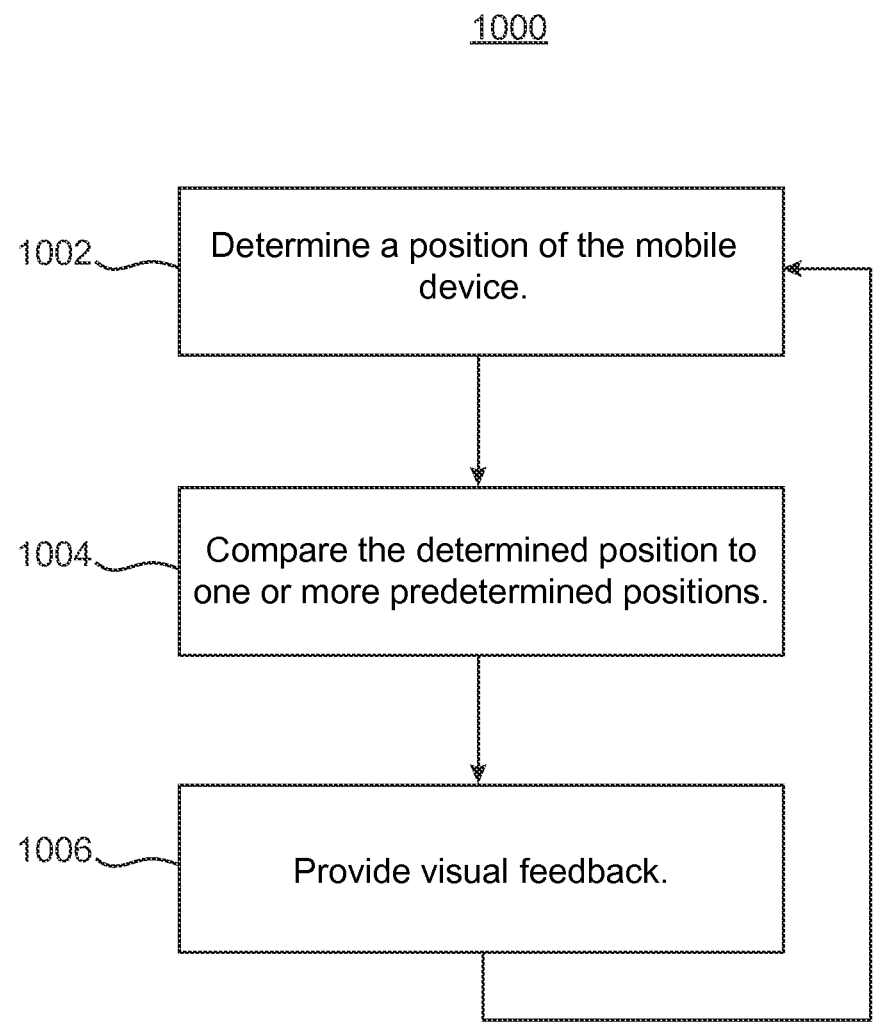
FIG. 10 is a flowchart of a method of providing a visual indicator on a mobile device in accordance with an exemplary implementation.

Referring to FIG. 10, a flowchart of a method for providing a visual indicator whether a mobile device is in an optimal position for conducting a conversation in a speaker phone mode. The exemplary method 1000 is provided by way of example, as there are a variety of ways to carry out the method. The method 1000 described below can be carried out using the communication devices and communication network shown in FIGS. 1-9 by way of example, and various elements of these figures are referenced in explaining exemplary method 1000. Each block shown in FIG. 10 represents one or more processes, methods or subroutines carried out in exemplary method 1000. The exemplary method 1000 may begin at block 1002.

At block 1002, a position of a mobile device can be determined. For example, the processor 338 receives a position signal from the position component 366 or one or more position components 366. The position signal can include one or more of yaw, pitch, and roll angle data of the determined position of the mobile device 100. After receiving the position signal, the method 1000 can proceed to block 1004.

At block 1004, the determined position can be compared to one or more predetermined positions. For example, in response to the processor 338 receiving the position signal, the processor 338 compares the determined position to one or more predetermined or optimal positions of the mobile device 100. The predetermined positions can include positions that provide optimal audio performance of the mobile device 100. The processor 228 can select the closest match and determine how the mobile device 100 should be adjusted. Other selection processes can be used. After comparing the positions, the method 1000 can proceed to block 1006.

Figure 5:
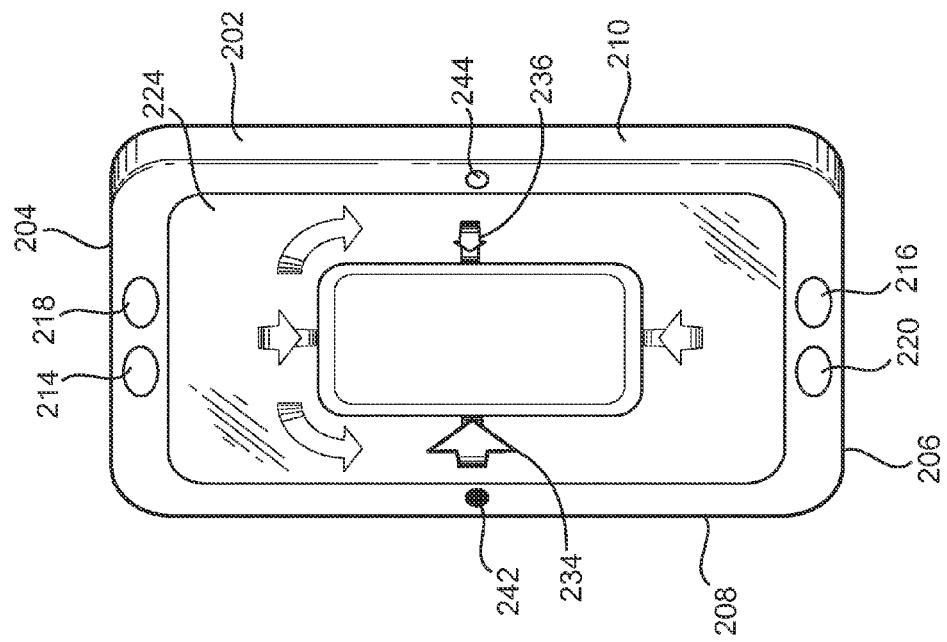
FIG. 5 is a front view of a mobile device displaying a visual indicator after a roll change in accordance with an exemplary implementation.
Figure 9:
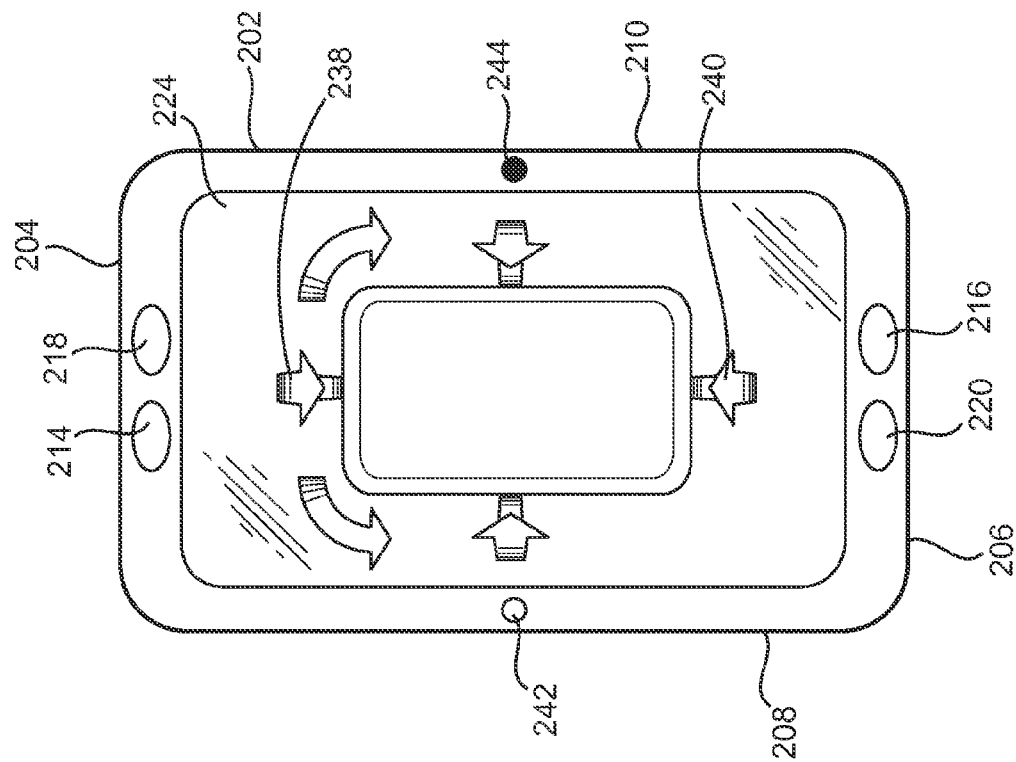
FIG. 9 is a front view of a mobile device displaying a visual indicator after yaw, roll and pitch changes in accordance with an exemplary implementation.

At block 1006, a visual indicator or feedback can be provided. For example, the processor 338 can display an image of the mobile device with arrows indicating how the mobile device 100 should be moved into an acceptable position. For example, FIGS. 2, 4, and 6 include images showing how the yaw, roll, and pitch angles should be adjusted, respectively. FIGS. 3, 5, and 7 show that the mobile device 100 is in an acceptable position. After providing the visual indicator, the method 1000 can proceed to block 1002 to determine the latest position of the mobile device 100 and repeat the method 1000 based on the latest position. The method 1000 can be performed at a predetermined rate, for example, every five seconds or in response to one or more position components 366 detecting a change in the position of the mobile device 100.

Examples of a mobile device 100 are shown in FIGS. 1-9. The implementations depicted in the figures show examples only, and persons skilled in the art understand the additional elements and modifications necessary to make the mobile device 100 operate in particular network environments. Although the mobile device 100 comprises a handheld communication device, the mobile device 100 may comprise a handheld wireless communication device, a personal digital assistant (PDA), laptop computer, desktop computer, a server, other communication device, or other portable computing device.

The present disclosure may be embodied in other specific forms without departing from its spirit or essential characteristics. The described implementations are to be conportioned in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. An electronic device comprising;
    a display;
    a position component configured to detect position data of the electronic device; and
    a processor communicatively coupled to the position component and configured to:
        receive the position data from the position component;
        compare the position data to one or more predetermined position data;
        render, on the display, a visual indicator of the electronic device, the visual indicator including a first orientation indicator; and
        adjust a characteristic of the first orientation indicator based on the comparison of the position data and the one or more predetermined position data, the characteristic adjustment identifying a direction to re-position the electronic device.

2. The electronic device of claim 1 wherein the position component is an accelerometer.

3. The electronic device of claim 1 wherein the position component is one of a gyroscope and a mercury switch.

4. The electronic device of claim 1 wherein the position data comprises roll, pitch, and yaw data.

5. The electronic device of claim 1 wherein the predetermined position data comprises acceptable limits for the position of the mobile device.

6. The electronic device of claim 1 wherein the visual indicator comprises an image displayed on the display communicatively coupled with the processor, the image illustrating how the electronic device should be moved.

7. The electronic device of claim 1 wherein the visual indicator comprises an animation displayed on the display communicatively coupled with the processor, the animation illustrating how the electronic device should be moved.

8. The electronic device of claim 1 wherein the visual indicator comprises displaying at least one color on the display communicatively coupled with the processor with the color indicating whether the position of the electronic device is in an acceptable position.

9. The electronic device of claim 8 wherein the at least one color is green indicating the electronic device is in an acceptable position and the at least one color is red indicating the mobile device is not in an acceptable position.

10. The electronic device of claim 1 further comprising:
    a green light emitting diode (LED) communicatively coupled to the processor and configured to provide the visual indicator by illuminating in the event the position of the electronic device is in an acceptable position; and
    a red LED communicatively coupled to the processor and configured to provide the visual indicator by illuminating in the event the position of the electronic device is not in an acceptable position.

11. The electronic device of claim 1 further comprising a single LED communicatively coupled to the processor and configured to provide the visual indicator by illuminating green in the event the position of the electronic device is in an acceptable position and illuminating red in the event the position of the electronic device is not in an acceptable position.

12. The electronic device of claim 1 wherein the one or more predetermined position data enhance an audio quality for the electronic device.

13. The electronic device of claim 4 wherein the first orientation indicator corresponds to the roll data and wherein the processor is configured to:
    render, on the display, the visual indicator of the electronic device, the visual indicator including a second orientation indicator that corresponds to the pitch data, and a third orientation indicator that corresponds to the yaw data; and
    adjust a characteristic of at least one of the first orientation indicator, the second orientation indicator, and the third orientation indicator based on the comparison of the position data and the one or more predetermined position data, the characteristic adjustment identifying a direction to re-position the electronic device.

14. A method comprising:
    determining, by a position component, a position of the electronic device;
    comparing, by a processor, the determined position to one or more predetermined positions;
    rendering, on a display, a visual indicator of the electronic device, the visual indicator including a first orientation indicator; and
    adjusting a characteristic of the first orientation indicator based on the comparison of the position data and the one or more predetermined position data, the characteristic adjustment identifying a direction to re-position the electronic device.

15. The method of claim 14 wherein the position of the electronic device comprises roll, pitch, and yaw data.

16. The method of claim 15 wherein the one or more predetermined position includes limits for the position of the electronic device.

17. The method of claim 16 wherein rendering the visual indicator further comprises displaying an image of the electronic device, the image illustrating the direction to re-position the electronic device.

18. The method of claim 16 wherein rendering the visual indicator further comprises displaying an animation of the electronic device, the animation illustrating the direction to re-position the electronic device.

19. The method of claim 16 wherein rendering the visual indicator further comprises displaying at least one color on the display of the electronic device, the at least one the color indicating whether the position of the electronic device is in an acceptable position.

20. The method of claim 19 wherein the at least one color is green indicating the electronic device is in an acceptable position and the at least one color is red indicating the electronic device is not in an acceptable position.

21. The method of claim 14 further comprising updating the rendering of the visual indicator in response to a change in the position of the electronic device.

22. The method of claim 14 further comprising updating the rendering of the visual indicator on a predetermined basis.

23. The method of claim 14 wherein the one or more predetermined positions enhance an audio quality for the electronic device.

24. The method of claim 14 wherein the first orientation indicator corresponds to the roll data and wherein the method further comprises:
- rendering, on the display, the visual indicator of the electronic device, the visual indicator including a second orientation indicator that corresponds to the pitch data, and a third orientation indicator that corresponds to the yaw data; and
- adjusting a characteristic of at least one of the first orientation indicator, the second orientation indicator, and the third orientation indicator based on the comparison of the position data and the one or more predetermined position data, the characteristic adjustment identifying a direction to re-position the electronic device.

* * * * *